(12) United States Patent
Camenisch et al.

(10) Patent No.: US 9,635,012 B2
(45) Date of Patent: Apr. 25, 2017

(54) METHOD FOR DERIVING A VERIFICATION TOKEN FROM A CREDENTIAL

(71) Applicant: International Business Machines Corporation, Armonk, NY (US)

(72) Inventors: Jan L. Camenisch, Thalwil (CH); Anja Lehmann, Zurich (CH); Gregory Neven, Oberrieden (CH)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 14/255,396

(22) Filed: Apr. 17, 2014

(65) Prior Publication Data

US 2014/0359289 A1    Dec. 4, 2014

(30) Foreign Application Priority Data

May 29, 2013    (GB) .................................. 1309535.1

(51) Int. Cl.
*H04L 9/32* (2006.01)
*H04L 29/06* (2006.01)
*H04L 9/08* (2006.01)

(52) U.S. Cl.
CPC ........ *H04L 63/0823* (2013.01); *H04L 9/0866* (2013.01); *H04L 9/3218* (2013.01); *H04L 63/062* (2013.01); *H04L 9/3263* (2013.01); *H04L 63/0407* (2013.01); *H04L 2209/04* (2013.01); *H04L 2209/42* (2013.01)

(58) Field of Classification Search
CPC ..... H04L 9/3263; H04L 9/0869; H04L 9/321; H04L 9/3218; H04L 2209/42; H04L 2209/04
See application file for complete search history.

(56) References Cited

U.S. PATENT DOCUMENTS

| 6,871,276 | B1 * | 3/2005 | Simon ................. H04L 63/0823 380/30 |
| 8,341,416 | B2 * | 12/2012 | Camenisch ........... H04L 9/3252 380/28 |
| 2009/0300347 | A1 * | 12/2009 | Camenisch ........... H04L 9/3073 713/155 |

(Continued)

FOREIGN PATENT DOCUMENTS

WO    2007/123895 A2    11/2007

OTHER PUBLICATIONS

Abendroth et al., "D5.2 Description of the "Common Denominator" Elements", Attribute-Based Credentials for Trust, Apr. 9, 2012.

(Continued)

*Primary Examiner* — Daniel Potratz
(74) *Attorney, Agent, or Firm* — Reza Sarbakhsh

(57) ABSTRACT

A method for deriving a verification token from a credential may be provided. The credential may be a set of attributes certified by an issuer to a user using a public key of the issuer. The method may comprise generating the verification token out of the credential and binding the verification token to a context string, wherein the verification token may comprise at least one commitment. A commitment may be a blinded version of an attribute. The method may also comprise generating an opening key for the verification token enabling a generation of a confirmation for a validity of the attribute.

14 Claims, 9 Drawing Sheets

(56) References Cited

U.S. PATENT DOCUMENTS

| | | | |
|---|---|---|---|
| 2010/0100926 A1* | 4/2010 | Binding | G06F 21/41 |
| | | | 726/1 |
| 2010/0115281 A1* | 5/2010 | Camenisch | H04L 9/302 |
| | | | 713/175 |
| 2010/0174911 A1 | 7/2010 | Isshiki | |
| 2011/0202991 A1* | 8/2011 | Paquin | H04L 9/3213 |
| | | | 726/9 |
| 2012/0159577 A1 | 6/2012 | Belinkiy et al. | |
| 2012/0233705 A1 | 9/2012 | Boysen et al. | |
| 2012/0260330 A1 | 10/2012 | Zlatarev et al. | |

OTHER PUBLICATIONS

Hajny et al., "Unlinkable Attribute-Based Credentials with Practical Revocation on Smart-Cards", CARDIS 2012.

GB Search Report, Application No. GB1309535.1, dated Nov. 25, 2013.

Yang et al., "Privacy-Preserving Credentials Upon Trusted Computing Augmented Servers", ISPEC 2007, pp. 177-192.

Camenisch et al., "Electronic Identities Need Private Credentials", Computer and Reliability Societies, IEEE 2012, pp. 80-83.

Camenisch et al., "Privacy-Enhancing Audit Methods for Attribute-Based Credentials", IBM Research, Nov. 1, 2012, pp. 1-12.

Camenisch et al., "A Signature Scheme with Efficient Protocols", 3rd International Conference on Security in Communication Networks 2002, on Lecture Notes in Computer Science, vol. 2576, pp. 268-289.

Damgard et al., "A Statistically-Hiding Integer Commitment Scheme Based on Groups with Hidden Order", ASIACRYPT 2002, Lecture Notes in Computer Science, vol. 2501, pp. 125-142, 2002.

United Kingdom Patent Application No. 1309535.1, Filed May 29, 2013, entitled: "Method for Deriving a Verification Token From a Credential".

* cited by examiner

METHOD FOR DERIVING A VERIFICATION TOKEN FROM A CREDENTIAL

CROSS REFERENCE TO RELATED APPLICATIONS

The present application claims the benefit of priority of United Kingdom Patent Application Serial Number 1309535.1, filed May 29, 2013, with the UK Intellectual Property Office (UKIPO), the contents of which are herein incorporated by reference in their entirety.

FIELD OF THE INVENTION

The invention relates generally to a method for deriving a verification token from a credential. The invention relates further to a system for deriving a verification token from a credential, a computing system, a data processing program, and a computer program product.

BACKGROUND

Managing privacy when using the Internet has become a critical component in using online services. Large parts of trade and public agencies—e.g., e-government—rely now on online services. The problem of stolen online identities has grown to a serious threat for online activities. Thus, managing identities in a secure and privacy-friendly way is a key success factor in expanding online services to more and more sensitive areas, like health care and other very personal areas. One way to address security and privacy issues may be in using (privacy-enhancing) credentials from a trusted issuer.

Attribute-based credentials, such as X.509 certificates or privacy-enhancing Identity Mixer credentials, are certified attribute-value pairs that are issued by an issuer, e.g., a trusted government-backed official authority—to a user. The user may then use those credentials to derive verification or presentation tokens that prove the validity of certain attributes towards a verifier, who accepts tokens originated from trusted issuers. Thus, those credentials, respectively derived tokens, provide a form of user authentication based on a set of certified user attributes.

There may be scenarios, such as accounting or auditing, where the verifier wants or has to give the received verification tokens to a further verifying party. For the sake of clarity, we call such a third party verifier an auditor in the remaining part of this document. In order to do such a verification token transfer in a verifiable way, i.e., allowing also the auditor to verify the validity of the verification token, the verifier, so far, would have to forward the entire verification token. That is, all user attributes that were revealed towards the verifier are also revealed towards the auditor. However, those might disclose more information than strictly necessary for the auditor's purpose.

Document US 2012/0260330 A1 discloses a computer implemented method for receiving a resource request at a representational state transfer (REST) client from a user. The resource request including a user ID, determining, by the REST client, a key pair including a public key and a corresponding private key that are associated with the user ID may be requested. Additionally, a certificate associated with the user ID that is signed by a certificate authority and based on at least the user ID and the public key associated with the user ID may be obtained by the REST client. Also, by the REST client, the user to a REST server may be impersonated using the certificate and the private key associated with the user ID. And, by the REST client, on behalf of the user, using a stateless protocol with the REST server, the requested resource may be accessed.

Furthermore, document US 2010/0174911 A1 discloses an anonymous authentication system comprising a group management device, an authentication-subjected user device, a verification device and an authentication-subjected user identification device. A user previously registers a verification key in the group management device such that his signature can be verified. For authentication, the user generates its own signature using the authentication-subjected user device, and encrypts the signature using an encryption key of the group to generate authentication data.

The verification device authenticates the signature in collaboration with a verification assistant who has a decryption key of the group. The authentication-subjected user identification device that has the decryption key of the group decrypts the authentication data as required to identify a user who is to be authenticated.

BRIEF SUMMARY

According to an embodiment of a first aspect of the present invention a method for deriving a verification token from a credential is provided. The credential may be a set of attributes certified by an issuer to a user with reference to a public key of the issuer. The method may comprise generating, in particular, on a user system, the verification token out of the credential, wherein the verification token may comprise at least one commitment, in particular, a plurality of commitments—e.g., one for each attribute—wherein a commitment is a blinded version of an attribute.

The method may further comprise generating an opening key, in particular, one opening key per commitment, for the verification token enabling a generation of a confirmation, e.g., in the form of an "accept" or a "reject" signal, for a validity of the attribute. The method may be, in particular, a computer-implemented method.

The verification token may also be bound to a particular context string, in particular a time stamp, an identifier or name string of the verifier, a URL of the verifier, or something else that may be verifier specific. This way it may be prevented that the verification token may be reused together with a different context string, e.g., with a different verifier.

According to an embodiment of another aspect, a system for deriving a verification token from a credential may be provided. The credential may be a set of attributes certified by an issuer to a user using of a public key of the issuer. The system may comprise a token generation unit adapted for generating the verification token out of the credential and for binding the verification token to a context string for preventing the verification token from being reusable together with a different context string, wherein the verification token comprises at least one commitment, wherein a commitment is a blinded version of an attribute.

The system may further comprise a key generation unit adapted for generating an opening key for the verification token enabling a generation of a confirmation for a validity of the attribute.

It may be noted that the set of attributes may also be a set of one attribute.

BRIEF DESCRIPTION OF THE SEVERAL VIEWS OF THE DRAWINGS

Preferred embodiments of the invention will now be described, by way of example only, and with reference to the following drawings.

DETAILED DESCRIPTION

Figure 1:
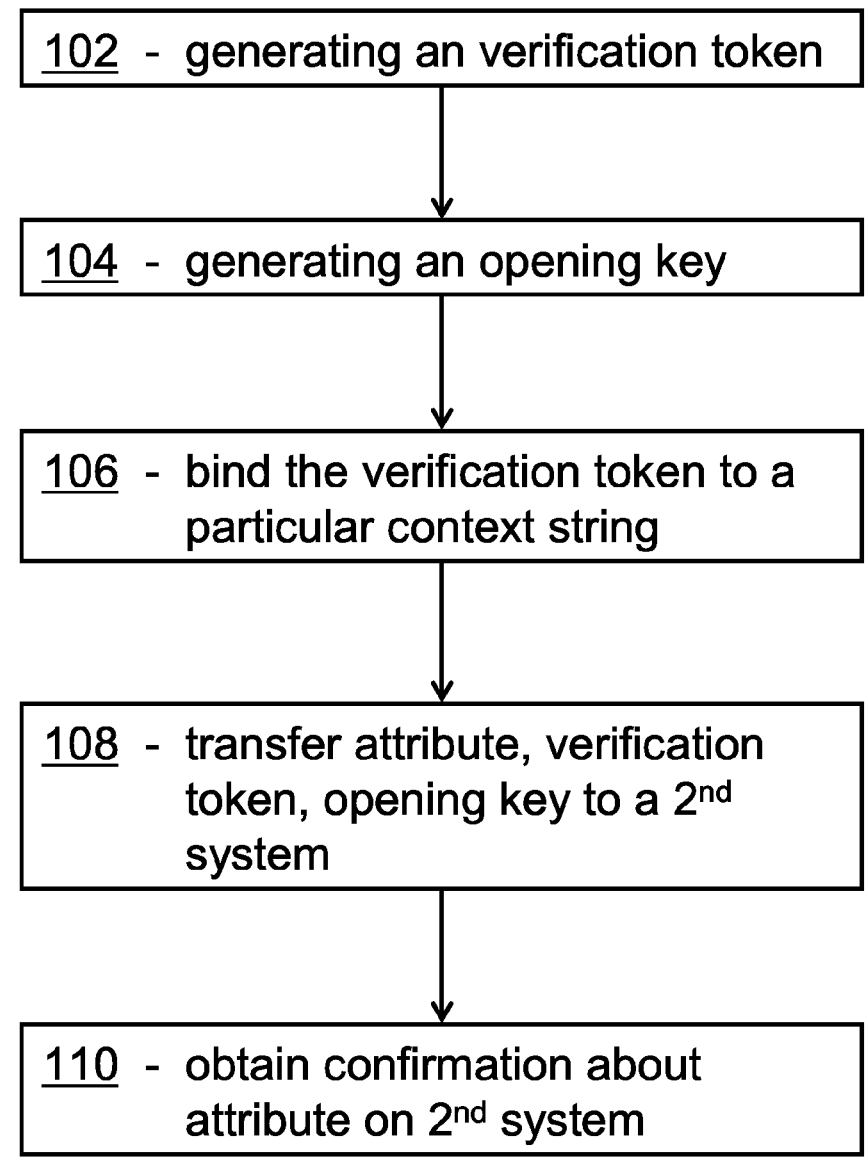
FIG. 1 shows a block diagram of an embodiment of the inventive method.

In the context of this description, the following conventions, terms and/or expressions may be used.

The term "credential" may denote a trusted attestation of "features of a person" or other data to be used to verify the validity of information given by that person. The credential may be used as verification for an access to electronic accounts, e.g., bank accounts or Internet shopping accounts. However, credentials may be used in a wide variety of ways, also for an access to governmental or healthcare services. Typically, a trust center or issuer certifies the credentials of a user who then may use the credentials as an authorization key. The credentials of a user may be certified based on information outside the computer networks in the real world.

The term "verification token" may denote a set of electronic data being based on the credentials of a person. Here, it may denote a set of attributes—only one attribute may be required—or feature of a person as mentioned above under credential. The verification token may be generated out of the credential by a trusted method and may comprise all attributes of the credentials, or a subset thereof.

The term "attribute" may denote a set of personal information of a user, like, full name, address, telephone number account number and other sensitive private information that should not be made available to the general public to avoid a misuse.

The term "commitment" may denote a blinded version of an attribute from the credentials. Thus, from the commitment alone a receiver may not be able to read the attribute, but at the same time a commitment already determines a concrete attribute. One verification token may comprise several commitments.

The term "opening key" may enable an opening of a commitment. Unless the user may know a secret trapdoor to the commitment, he may open a commitment only to the attribute he initially committed to. A verification function may have as input a verification token comprising certified commitments, an opening key, and an attribute beside, e.g., a public encryption key of the issuer of the credential(s). As output, the function may generate a "yes"/"no" or "accept"/ "reject": meaning that either the given attribute fits the verification token and hence the credentials, and hence an attribute of a real person.

The term "first system" may denote a computer system of a user, e.g., an online bank client or an online shopper. He may have received his credential(s) from an issuer. The user may generate the verification token and may send it to a bank of an online retailer for an online transaction. This receiver may be a verifier.

The term "second system" may denote a computer system of a verifier. He may receive the verification token from the user via the first system. The second system may forward the verification token to an auditor, in particular an auditor's computer system.

The term "third system" may denote a computer system of an auditor. The auditor may be an industry association, a central administrative department of the online retailer, being represented by the second system. A core point here is that the auditor may not be able to verify all attributes of the credential(s). Only a limited set of the credential(s)—i.e., the attributes of a user—may be visible to him by use of the inventive method.

The term "redacted subset" may denote that a subset of the attributes of the verification token may be accessible. Only those attributes of the credentials may be verifiable for which opening keys exist. Thus, a verification token may be forwarded; however, not all attributes of a user may be made verifiable in a trusted way. Thus, the receiver—which is represented by the second system—may redact the verification token to disallow a verification of the specific attribute of the user.

The term "issuer" may denote a trusted authority generating a credential out of attributes of a user or other data.

The term "public key" may denote an authentication key that may be publicly available for verifying information that was previously authenticated, using the corresponding secret key.

The term "context string" may denote and string of characters, in particular a string that may be linked in one or the other way to the verifier. There may be no link to any specifics about the user in order avoid tractability of the user but at the same time make the verification token verifier specific and case specific. This means that a different verification token may be generated every time a verification may be generated even if the credential or attributes may be the same. An example for a context string may be a time stamp for the time of generation of the verification token, a URL of the verifier or any other public unspecific information about the verifier.

The proposed method for deriving a verification token from a credential may offer a couple of advantages.

An objective of the invention, to protect private information better than using available techniques, may be achieved. Embodiments of the invention may allow the verifier to further reduce a received verification token, such that it reveals only a subset of the received attributes, but at the same time still verifies under the original issuer's key. To maintain the security guarantees, it may be crucial that the verifier may only reduce but not alter the information of a received verification token. Furthermore, for certain attributes it should be even up to the user to decide whether or not attributes may be forwarded to a third party in a verifiable manner. That is, for those attributes that the user wants to keep confidential between him and the verifier, the verifier should not be able to convince the auditor that the user previously proved their validity.

Hence, the present disclosure describes mechanisms for both issues: (a) it describes mechanisms to generate a verification token that enables a verifier to further reduce the amount of disclosed information while preserving the verifiability of the verification token, and (b) also restricts the verifier to those attributes that the user approved to be transferred.

Thus, a user may control and manage private information, i.e., attributes, even down the information chain to a verifier and further down to an auditor on a need-to-know-basis. The information disclosed from a user to a verifier may be managed differently from verifier to verifier and also down the information paths from the different verifiers to the different auditors. Only needed information may need to be disclosed. However, all may be based on trusted credential(s) without the need for a user to alter the credential that has been generated by a trusted issuer.

The inventive concept of the present disclosure may also make available a series of more advantages: A selective audit mechanism for attribute-based credentials may be called secure if it may provide the following security properties, which is the case with the inventive concept described here.

Unforgeability: A user should not be able to derive a verification token for attributes that were never certified by the issuer, or more precisely derive a verification token for a commitment that opens to uncertified attributes. Also, a verifier who may have observed several verification tokens should not be able to impersonate the user. Thus, different verification tokens may be generated with every new nonce N—which may, in particular be chosen by the verifier—and/or a verifier identifier V even if the attributes may be the same.

Secrecy: An auditor should not be able to learn anything about the hidden attributes in the forwarded verification token. He may only be able to get a confirmation about the received attributes. Other attributes hidden in the verification token in commitments are not accessible at all to the auditor. Optionally, one may additionally insist that an audit mechanism may also be private by satisfying the following properties, which may also be the case here:

Unlinkability: A verifier (or several verifiers) should not be able to link different verification tokens derived from the same credential together. That is, an adversary given two verification tokens should not be able to tell if they were derived from the same credential, or from two different credentials, significantly better than guessing.

Untraceability: An issuer colluding with (several) verifiers should not be able to link the issuance of a credential to a derived verification token. Thus, roughly, an adversary given two credentials and a verification token derived from one of them, should not be able to determine whether the verification token was derived from a first or a second credential significantly better than guessing.

Unlinkability and untraceability are always conditioned on the information that may be leaked by the disclosed attributes in a verification token. As mentioned above, one may reduce the amount of attributes that are revealed in a verification token by letting the user send the opening keys only for the attributes he wants to disclose and not for all.

It may be stated that all characteristics mentioned may be satisfied by specific embodiments of the disclosed invention.

According to one embodiment of the method, the generation of the verification token and the opening key may be performed in a first system, which may be the computer system of the user. The method may also comprise transferring a first tuple comprising an attribute, the verification token, and the opening key, in particular one key for every commitment, from the first system. The first tuple may be receivable by a second system, which may be the computer system of the verifier. Thus, at the second system, a confirmation about the validity of the attribute, in particular a plurality of attributes may be obtainable, based on the first tuple and the public key of the issuer. This way, a secure generation of the verification token and corresponding opening key, or corresponding verification tokens and corresponding opening keys may be performed.

According to an additional embodiment of the method, the method may further comprise transferring from the first system, in particular the user's computer system, a second tuple comprising a plurality of attributes together with a corresponding verification token comprising commitments for the plurality of attributes, and corresponding opening keys for each attribute and commitment combination. The second tuple may be received by the second system, in particular the verifier's computer system.

In a subsequent step, the method may also comprise transferring from the second system to a third system, in particular the auditor's computer system, a subset of the plurality of attributes, the verification token, in particular comprising the commitments for the subset of the plurality of attributes, and a subset, in particular a redacted subset, of opening keys related to the subset of the plurality of attributes.

Furthermore, the method may comprise obtaining at the third system, in particular the auditor's computer system, a confirmation about the validity of the subset of the plurality of attributes based on the verification token, the subset of opening keys, and the public key of the issuer.

It may be noted that the plurality of attributes comprised in the second tuple may comprise only one attribute without deriving from the concept invention. In a particular case, the subset sent from the second system to the third system may comprise one or even none commitment as part of the verification token. In such a use case, the auditor may, e.g., be a party collecting information about the usage of this privacy-enhancing security system. The auditor may not be entitled to receive any attributes. The verification token the auditor would receive in such a case would merely certify the fact that the user owns a credential of a certain type, but would not reveal any of the attributes contained in the credential.

An advantage of this additional method step is ability of the verifier to send in a secure way only a subset of verifiable attributes from his computer system to an auditor's computer system in a way that may be trusted by the auditor. It may not be required to send the complete set of attributes received by the verifier from the user.

According to one advantageous embodiment of the method, the generation of the verification token may be performed using a public key of the second system, in particular the verifier's computer system. As a consequence, the verifier may use his secret key for the verification of the received attributes so that he can be sure to have received trusted attributes from the user. However, if the verifier would forward the received attributes, the auditor cannot be sure to have received the correct attribute. The verifier may have manipulated the attributes and corresponding commitment and opening keys.

In one embodiment of the method, the generating of the verification token is based on an anonymous credential scheme. This may allow for an unlinkable and untraceable verification token. In some embodiments, the verifier may choose to forward the complete set of attributes to an auditor, and in another embodiment the user may dictate which and how the verification token may be redacted.

The method's the anonymous credential scheme may be, in one embodiment, a Camenisch-Lysyanskaya signature. This kind of signature may allow—in one enhanced embodiment—for a user control of the redactability of the verification token by the verifier before the information comprising the verification token and the attributes may be sent to the auditor.

According to an advanced embodiment of the method, an attribute may be selected out of the group comprising first name, last name, address, age, customer number, credit line, account number, bank name, social security number, insurance number, and credit card number of the user. Any other attribute that may be transferred in a secure way may be selected.

According to again another embodiment of the method, the generation of the verification token, the generation of the opening key, the obtaining of the confirmation at the second system and the obtaining of a confirmation at the third system may be each performed each with a respective certified function. This way, an end-to-end secured verification process may be achieved.

According to a further embodiment of the method, the generation of the verification token and corresponding opening keys for commitments comprised in the verification token may result in different verification tokens for identical credentials each time the verification token may be generated. This way, it may become impossible for the issuer to link different attributes of the user. Privacy of users may be enhanced.

Furthermore, embodiments may take the form of a computer program product, accessible from a non-transitory computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be a non-transitory electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, a block diagram of an embodiment of the inventive method for deriving a verification token from a credential is given. Afterwards, further embodiments of the system for deriving a verification token from a credential will be described.

FIG. 1 shows a block diagram of an embodiment of the inventive method 100. The method 100 for deriving a verification token from a credential may comprise generating, 102, the verification token out of the credential. The verification token comprises at least one commitment. The commitment is a blinded version of an attribute that is committed to a certain attribute. Furthermore, the method may comprise generating, 104, an opening key for the verification token enabling a generation of a confirmation for a validity of the attribute.

The generating, 102, of the verification token may also comprise binding, 106, the verification token to a context string for preventing the verification token to be reusable together with a different context string. In one implementation, activity 102 and 106 may be performed together in one step.

In another version of the method, performing the generation, 102, of the verification token and the generation, 104, of the opening key may be performed in a first system, which may be a user system. Afterwards, a first tuple comprising an attribute, the verification token, and the opening key may be transferred, 108, from the first system to be receivable by a second system, e.g., a verifier system. Here, it may be interpreted such that a confirmation about the validity of the attribute, in particular a plurality of attributes, based on the first tuple and the public key of the issuer may be obtainable, 110.

Figure 2:
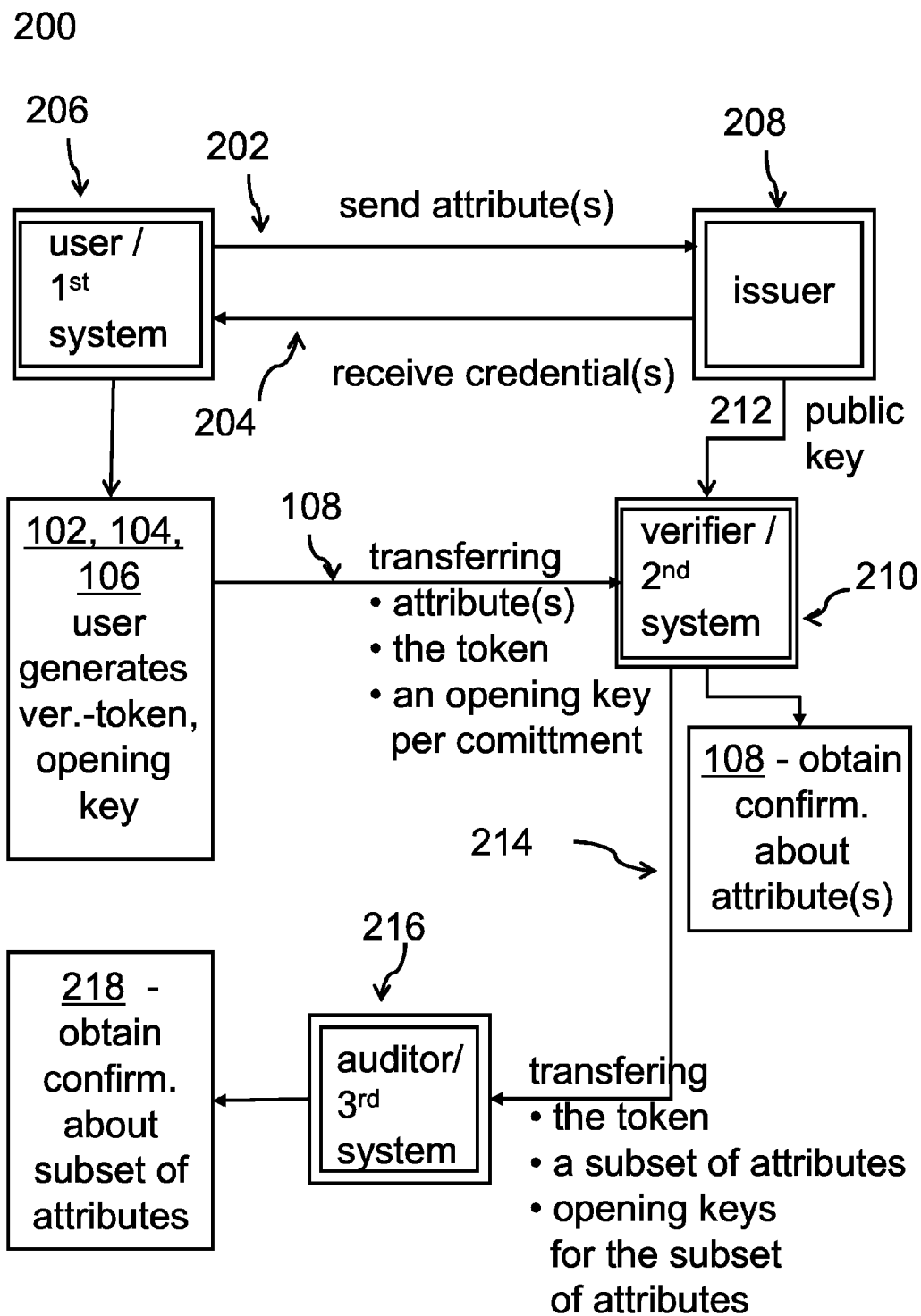
FIG. 2 shows an overview block diagram of attribute transfer from a user to a verifier to an auditor.

A more detailed description of the above process is given in the flow 200 by referring to FIG. 2. It may be noted that systems of involved parties, e.g., issuer, user, verifier, auditor, are shown with a double line. Activities in the process are shown as single line boxes. A user may operate a first computer system 206. The user may want to have attributes certified by a trust center, in particular an issuer 208 of credential(s). In a traditional environment, the user may send, 202, its attributes, like name, address, customer number, credit card number and the like, to the issuer 208. In return, the user may receive, 204, credentials from the issuer 208 for further usage in electronic commerce environments. An encrypted communication may optionally be used between the first system 206 and the computer system of an issuer 208. At the end of a credential generation, the user may obtain a credential cred on a set of attributes a0, . . . , aL which may be signed with respect to a public key pkI of the trusted issuer.

In the current case, the user 206 may then generate, 102, on the first system a verification token tok from the credential cred which may allow further selective auditing by running the verification token with a commitment generation algorithm. Further the user may generate, 104, one or more opening keys oi. The verification token tok may comprise at least one commitment $C_i$ which may be a blinded version of an attribute $a_i$. There may be one opening key $o_i$ per commitment $C_i$. The generation of the verification token tok and the opening key(s) may also involve the credential(s):

$(tok,(C_i,o_i)_{i \in D}) \leftarrow \text{Token\_w\_Commitment\_Gen}(cred,D, N, V),$ This algorithm may return a verification token tok that now certifies the commitments Ci of the attributes ai with indices $i \in D \subseteq \{0, \ldots, L\}$ instead of the concrete user's attributes itself. A commitment may be a blinded version of the attributes, i.e., it may hide the actual attribute value, but at the same time it may also be strictly bound to that value. The other outputs oi may be the individual opening keys for those commitments which allow to re-obtain the concrete attribute values from the commitments in an unambiguous way again. The other inputs may be a random nonce N chosen by the verifier to guarantee freshness of the verification token and an identifier V for the verifier to whom the verification token is intended. The user must be able to somehow check the verifier's identifier V. Here, this check is not modeled, but the identifier V could, for example, be the verifier's public key or, it could be its URL if a PKI is in place to authenticate servers by their URL. The verification token may be "bound" to the nonce N and the verifier's identifier V, in the sense that it may not be used out of context with a different nonce N or verifier's identifier V, thus preventing man-in-the-middle attacks. The credential may also comprise further secret cryptographic information that may be used, but not necessarily revealed when authenticating to a verifier. Finally, the user may send (tok, (ai, Ci, oi)i∈D) to the verifier. For simplicity, it may be assumed that the user may reveal all attributes towards the verifier. However, selective disclosure may be added be sending the opening information only for those attributes that are supposed to be revealed.

In an alternative embodiment, the generation of the verification token and the opening keys may be performed by the issuer 208. However, the above described alternative allows more privacy because the user is in control of the process.

It may be mentioned that when generating, 102, the verification token, the first computer system may also involve a public key from the second system. This means, the verification token becomes verifier-specific.

In a next step, the user 206 or, used here as a synonym, the first system 206 may transfer, 106, one or more attributes, the verification token, one or more opening keys to a second system 210. It may be the system of a verifier. In classical e-commerce environments, a verifier may be a bank, an Internet retailer or Internet trading partner, or the like. Actually, the user 206 may create verification tokens that may comprise less attributes than in the corresponding credential. The verifier 210—also used as synonym for the second system 210—may use the verification token and the available opening keys to obtain, 108, a confirmation that the related attributes received from the first system 206 are valid and based on the credential(s) from the issuer 208. In addition, the second system 210 may use the public key pkI 212 from the issuer 208 to get an "accept" or a "reject" message:

$\text{accept/reject} \leftarrow \text{token\_verif}(pk_I, tok, (C_i)_{i \in D}, (a_i, o_i)_{i \in D}, N, V),$ As can be seen from the above formula, also the random nonce N chosen by the verifier to guarantee freshness of the verification token and an identifier V for the verifier to whom the verification token is intended, are included in the input list of the algorithm.

In a further process step, the verifier 210, in particular, the second system 210, may want to send, 214, a portion $E \subseteq D$ or subset of the set of attributes received in a trusted way to an auditor 216, e.g., using a third system 216. This may be a market data gathering entity or a clearing house which may not be entitled to receive the full set of attributes or information exchanged between the first system 206 and the second system 208. However, the auditor 216 may be able to obtain a trusted confirmation, 218, about the subset of attributes received from the verifier 210. To achieve this, special provisions are required which will be described using the following figures. An advantageous aspect may be in the ability of the auditor 216 to trust the redacted set of attributes by the verifier 210 in the same way the auditor may trust attributes he may receive directly from the user 206 based on the credential from the issuer 208.

Figure 3:
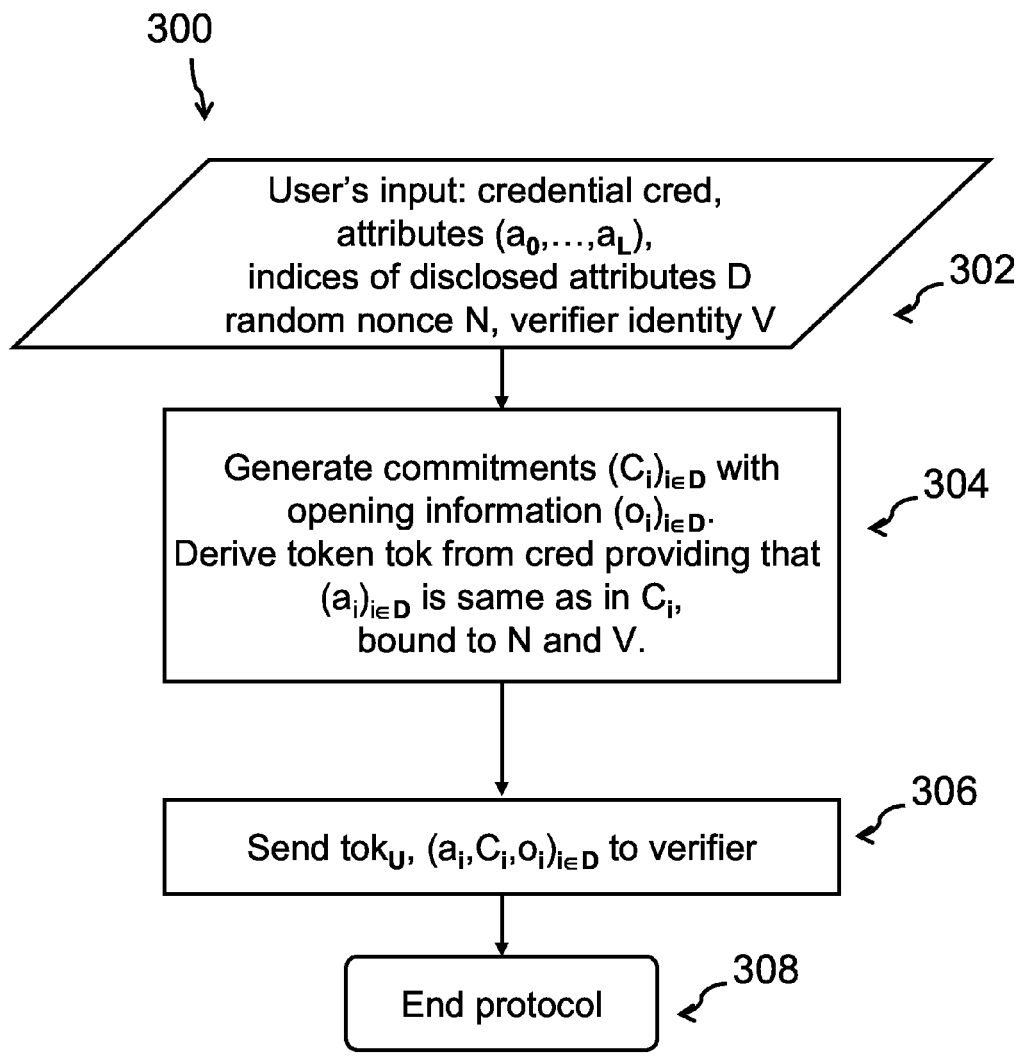
FIG. 3 shows a block diagram for a generation of commitments and corresponding opening keys.

FIG. 3 shows a block diagram 300 of a verification token tok generation by a user, in particular on a first system. At 302, the user may receive as input for the verification token generation on the user's computer system: credentials cred which he may have received from an issuer, a set of attributes (a0, . . . , aL) and indices i of disclosed attributes D. The verification token is "bound" to a nonce N chosen by the verifier and to the verifier's identifier V, so that the verification token cannot be used out of context for a different nonce N' and/or verifier V'. Thus, man-in-the-middle-attacks may be prevented.

Using a commitment generation function, at 304, the user using the user system may generate commitments (Ci)i∈D with opening information (oi)i∈D. At the same time, a verification token tok may be generated from cred (and potentially skU) proving that (ai)i∈D in Ci are the same attributes as certified in the credential cred.

At 306, the user may send the verification token tok, as well as attributes (ai)i∈D, commitment (Ci)i∈D, and opening keys (oi)i∈D to the verifier or second system. At 308, this protocol ends.

Generally, three groups of attributes may be differentiated from each other. Group D attributes may relate to those attributes and commitments that a user may send to a verifier. The commitment may be opened and verified by the verifier and may also be further transferred to an auditor.

Group F attributes may related to those attributes and commitments that a user may send to a verifier. The commitment may be opened and verified by the verifier but may NOT be further transferable to an auditor in a trusted way. Group D and F may not have common elements (see below).

Group E may be a subset of group D attributes and may be related to those attributes and commitments that a user may send to a verifier as part of group D to be opened and verified by the verifier. The verifier may choose to transfer only group E attributes, commitments and opening keys to an auditor (see below).

Figure 4:
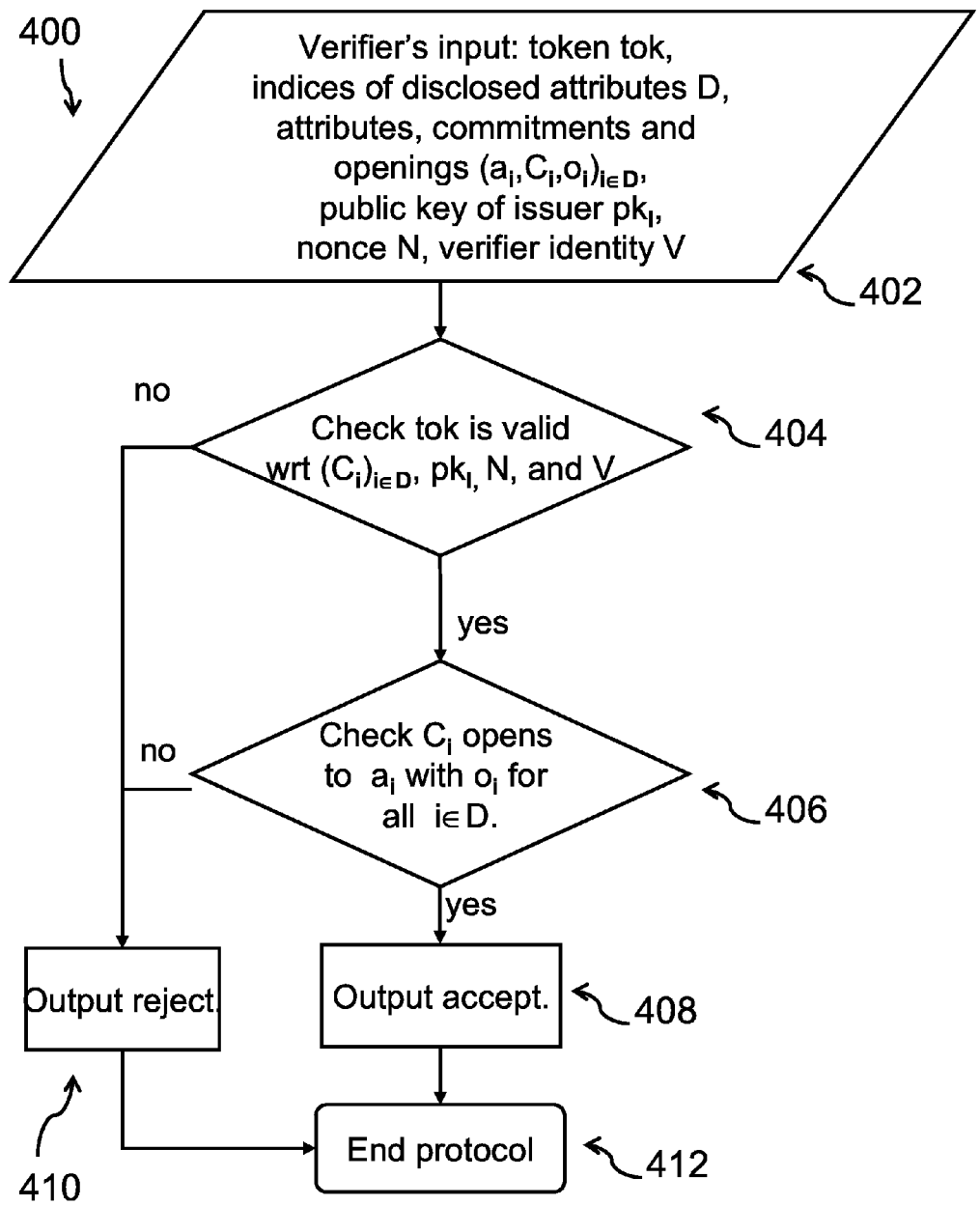
FIG. 4 shows a block diagram of a verification of the received token by a verifier.

FIG. 4 shows a block diagram 400 for a protocol performed on the verifier side on the second system for a verification token and attributes verification. As input parameters, the following may be used, 402: verification token tok, indices of disclosed attributes D, attributes (ai) i∈D, commitments (Ci)i∈D, and opening keys (oi)i∈D, as well as the public key pkI of the issuer, as well as a verifier related nonce N and a verifier's identifier V.

At 404, it may be checked whether the verification token tok is valid with respect to pkI. In the following, in the figures, "wrt" may be used as abbreviation for "with respect to". If "yes", at 406 on the verifier system, it may be checked whether the commitments Ci may confirm the validity of attribute ai using the opening key of for all i∈D. At 408, if "yes", the attributes may be confirmed or verified. In case the verification token may not be valid or the attributes may not be confirmed as valid, the verification token or the attribute validation may be rejected, 410. At 412, this protocol ends.

In a more mathematical way, the process flows for fully transferable attributes from a verifier to an auditor according to FIG. 3 and FIG. 4 may be described as follows:

The issuer of the credential cred may generate a key pair of public and secret key (pkI, skI) for a redactable signature scheme. For each credential cred, the user may generate a fresh signature key pair (pkC, skC) for a standard signature scheme. A user's credential cred on attribute values $a_0, \ldots, a_L$ is a redactable signature $\sigma C$ by the issuer on $(a_0, \ldots, a_L, pkC)$, together with the secret key skC.

To create a verification token that discloses attributes $(a_i)_{i \in D}$, the user first authenticates the verifier V and receives a random nonce N, redacts the signature $\sigma C$ to a new signature $\tau$ that certifies only the attributes $(a_i)_{i \in D}$ and pkC, but hides the attributes $(a_i)_{i \notin D}$. The user also creates a standard signature $sC = Sign_{skC}(D, N, V)$ and sends the verification token tok=$(\tau, s)$ to the verifier. The verifier checks that $\tau$ is a valid redactable signature for $(a_i)_{i \in D}$ and pkC under the issuer's public key pkI, and checks that s is a valid signature of (D, N, V) under pkC.

To create an auditable verification token for attributes $(a_i)_{i \in E} \subseteq D$, the verifier further redacts the signature $\tau$ to a signature $\tau'$ that only certifies attributes $(a_i)_{i \in E}$ and pkC. The verifier sends the derived verification token tok'=$(\tau', s, D, N, V)$ to the auditor, who checks whether $\tau'$ is a valid redactable signature on $(a_i)_{i \in E}$ and pkC under pkI, that s is a valid signature on (D, N, V) under pkC, and that $E \subseteq D$.

In case of a private construction from anonymous credentials, the process may become a bit more complex. The issuer generates a Camenisch-Lysyanskaya (from here on CL) signature key pair (skI, pkI)=(p, (n, R0, ..., RL, S, Z)). The values R0, ..., RL, S, Z may be values of the private key of the issuer. A user's credential cred on attribute values $a_0, \ldots, a_L$ is a CL signature (e, A, v) on the message $(a_0, \ldots, a_L)$. It may be assumed that $a_i \in \pm \{0,1\}^{lm}$, or that a collision-resistant hash function is used to map them into this range.

A description about Camenisch-Lysyanskaya signatures may be found in "A signature scheme with efficient protocols" from Jan Camenisch and Anna Lysyanskaya; in Stelvio Cimato, Clemente Galdi, and Giuseppe Persiano, editors, SCN 02: 3rd International Conference on Security in Communication Networks, volume 2576 of Lecture Notes in Computer Science, pages 268-289; Springer, September 2002. Further mathematical background explanations may be found in: Ivan Damgard and Eiichiro Fujisaki. A statistically-hiding integer commitment scheme based on groups with hidden order. In Yuliang Zheng, editor, Advances in Cryptology—ASIACRYPT 2002, volume 2501 of Lecture Notes in Computer Science, pages 125-142. Springer, Dec. 2002.

When the user wants to create a verification token that discloses attributes $a_i$ for $i \in D \subseteq \{0, \ldots, L\}$ to the verifier, the user may proceeds as follows: For each disclosed attribute $i \in D$ he creates a commitment $C_i = Com(a_i, o_i)$ for a random $o_i \in Z_q$. The user then may re-randomizes his credential (e, A, v) to (e, A', v') and creates a signature proof of knowledge $$\Sigma = SPK\{(i, v', a_0, \ldots a_L, (o_i)_{i \in D}):$$

$$Z = \pm R^{a_0}_0 \ldots R^{a_L}_L A'^e S^{v'} \pmod{n} \wedge a_i \in \pm \{0, 1\}^{lm} \wedge 2^{le} > e > 2^{le-1} \wedge_{e \in D} C_i = g^{a_i}_0 g^{o_i}_1 \}((C_i)_{i \in D}, D, N, V).$$

It then sends the verification token tok=(A', v', $\Sigma$) together with $(C_i)_{i \in D}$ and $(a_i, o_i)_{i \in D}$ to the verifier. To verify the verification token, the verifier checks the signature proof $\Sigma$ and checks that $C_i = Com(a_i, o_i)$ for all $i \in D$.

When the verifier wants to transfer the verification token tok to the auditor while disclosing only the value of attributes $a_i$ for $i \in E \subseteq D$, it sends the verification token tok=(A', v', $\Sigma$) together with $(C_i)_{i \in D}$, $(a_i, o_i)_{i \in E}$ to the auditor. The auditor checks the signature proof $\Sigma$, checks that $C_i = Com(a_i, o_i)$ for all $i \in E$, and checks that $E \subseteq D$.

Figure 5:
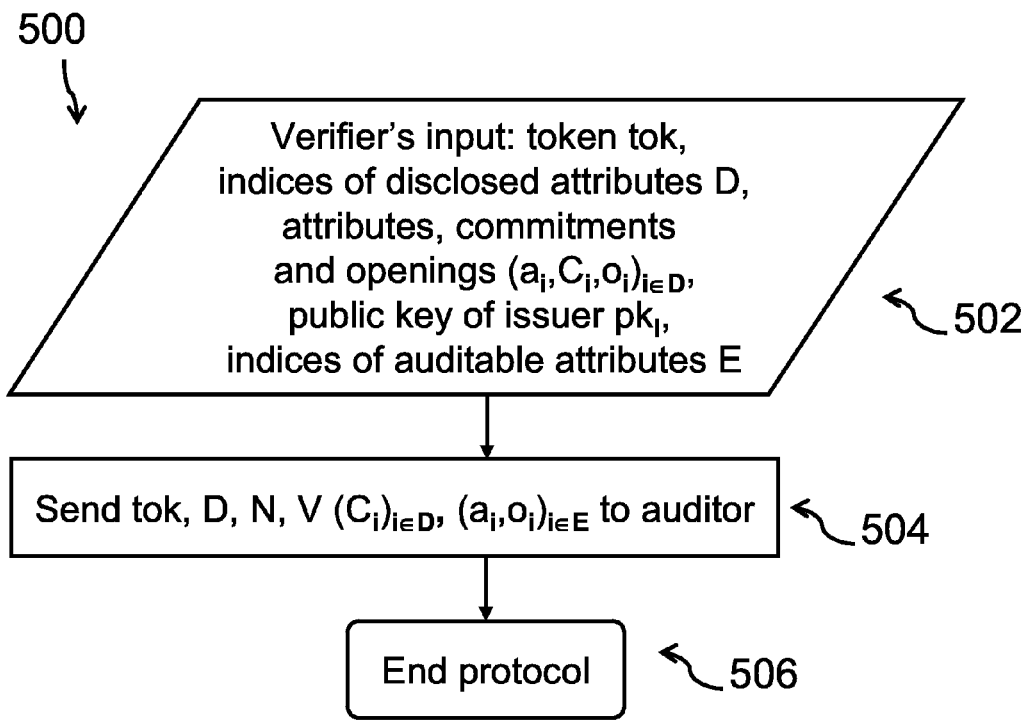
FIG. 5 shows a block diagram of a verification token redaction by the verifier.

FIG. 5 shows a block diagram 500 for the case the verifier may redact, i.e., reduce the set of attributes forwarded to an auditor, i.e., a third system. Here, the verifier using the second system, uses the following as input, 502: verification token tok, indices of disclosed attributes D, attributes, commitments and opening keys $(a_i, C_i, o_i)_{i \in D}$, public key of issuer pkI, indices of auditable attributes E. It should be noted that the number of indices E may be smaller than the number of attributes the verifier may have received from the user. Thus, the verifier only discloses a subset of attributes he received from the user to the auditor.

At 504, the verifier, i.e., second system may send the verifications tok, as well as $(C_i)_{i \in D}$, $(a_i, o_i)_{i \in E}$ to the auditor, i.e., third system. It may be noted that E may be smaller than D. Additionally, the nonce N of the verifier and a verifier identification V may be sent from the verifier to the auditor. The protocol may end at 506.

Figure 6:
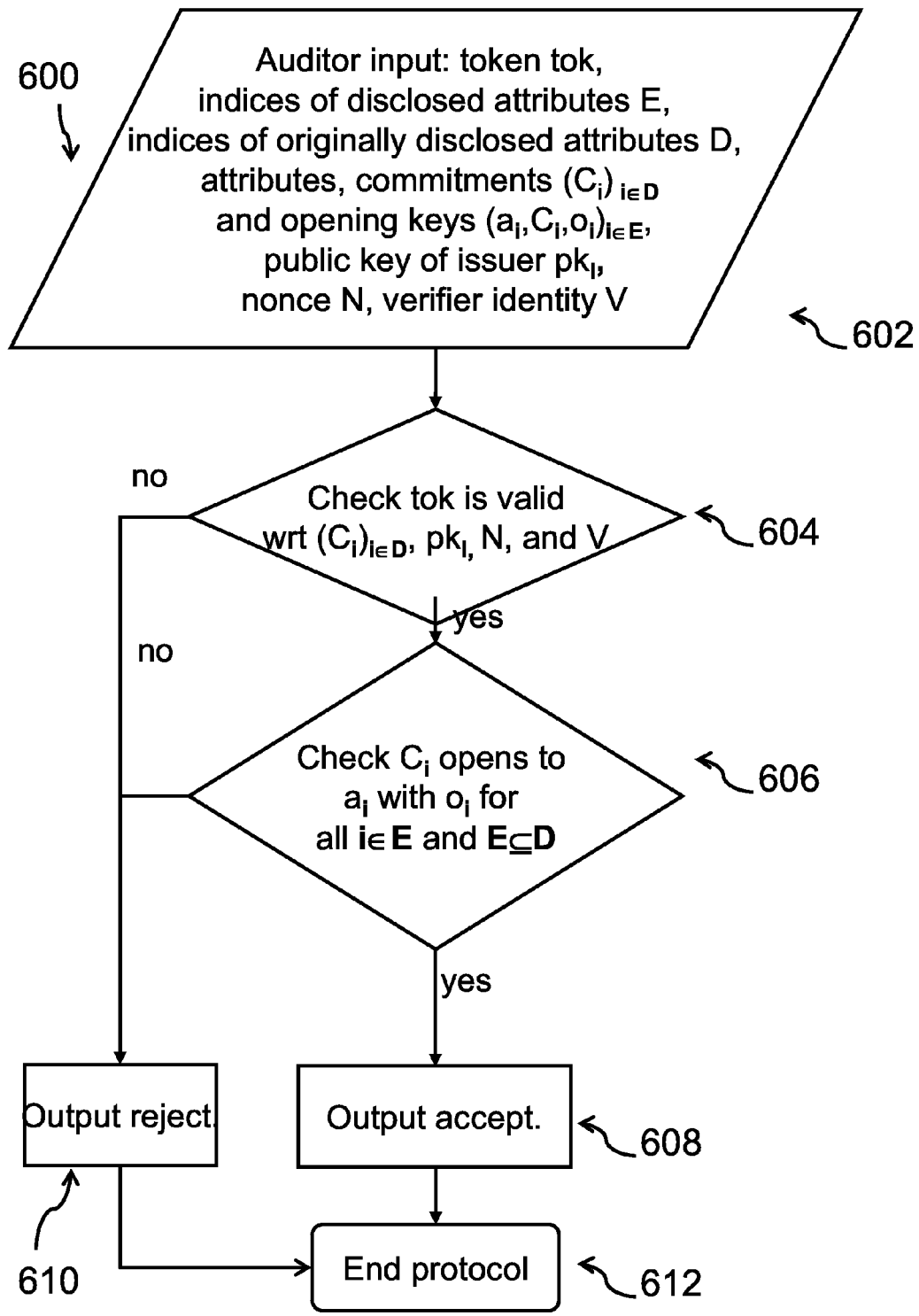
FIG. 6 shows a block diagram of a verification of a received set of attributes by an auditor.

FIG. 6 is a block diagram 600 for a verification protocol at the auditor, i.e., at the third system side. It is essentially the same as the verification procedure on the second system for the verifier, as shown in FIG. 4. However, it may be noted that in this case the index group is not D but E. Apart from this, the reference numerals 602, 604, 606, 608, 610, 612 are equivalent to the FIG. 4, namely, 402, 404, 406, 408, 410, 412, respectively. Therefore, it will not be described again.

Figure 7:
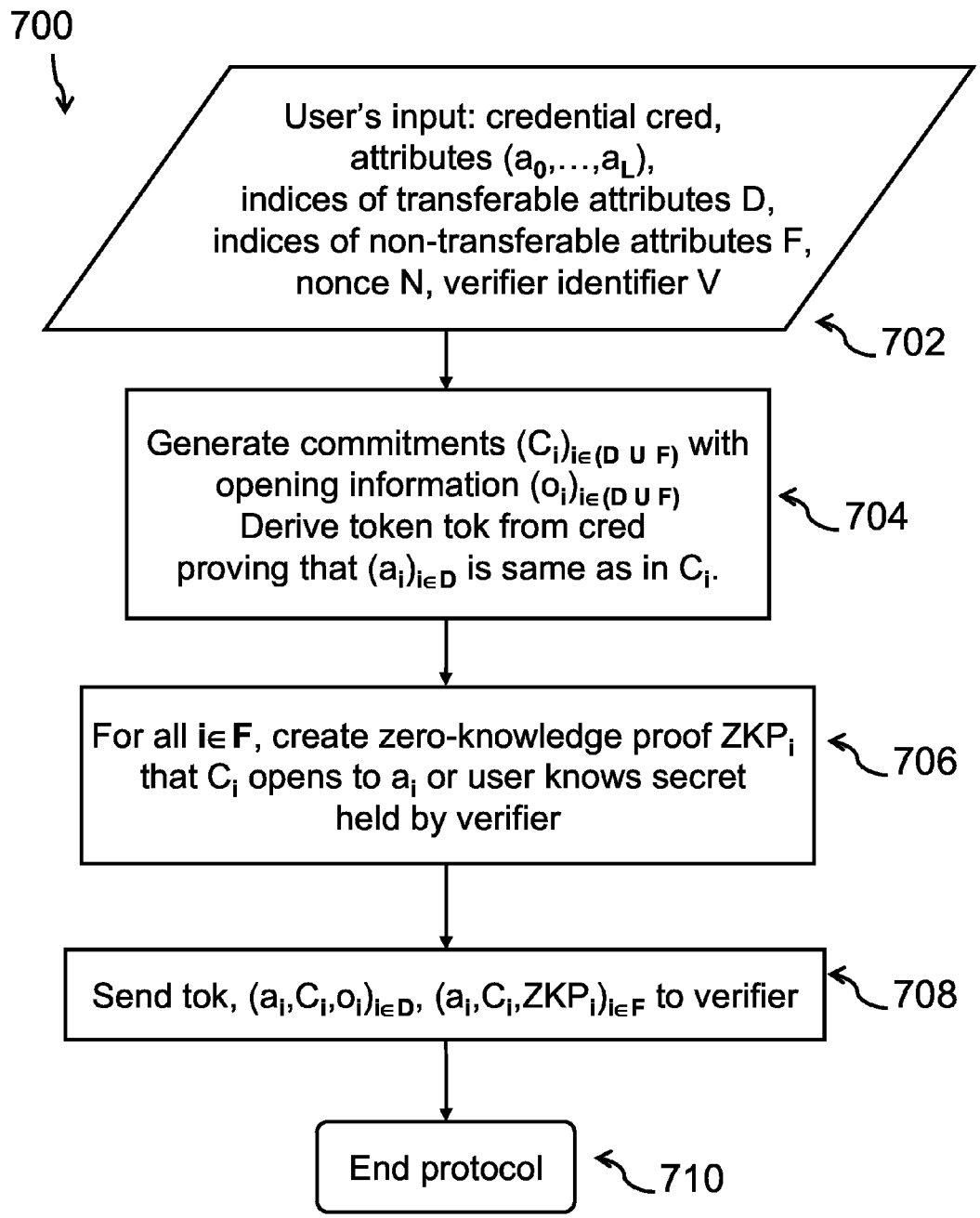
FIG. 7 shows a block diagram of a secure generation of commitments and opening keys by a user for the case of redactable non-transferable attributes.

In case the process flow should reflect an enhanced embodiment wherein the user may be able to specify non-transferable attributes via commitments comprised in the verification token in a trusted, verifiable way from a verifier to an auditor, block diagram 700 of FIG. 7 becomes relevant. This time, at 702, the user may select the following input values for his computer system: credential cred, attributes $(a_0, \ldots, a_L)$, indices attributes D transferable from the verifier to the auditor, and indices of attributes F which shall not be transferable from the verifier to the auditor in a verifiable way. Furthermore, the input values may also comprise the verifier related nonce N and a verifier's identifier V. Hence, the auditor may not know whether he may trust the attributes presented or not for the last attributes mentioned.

At 704, the user may generate commitments $(C_i)_{i \in (D \cup F)}$ with opening keys $(o_i)_{i \in (D \cup F)}$ and derive a verification token tok from cred and the secret key of the user skU proving that $(a_i)_{i \in D}$ is the same as in $C_i$. It may be noted that "D∪F" stands for the group of indices of D joint with the group of indices of F (union sign).

At 706, at the first system of the user, zero-knowledge proof $ZKP_i$ may be created for all $i \in F$, that $C_i$ opens to $a_i$ or prover knows the verifier's secret. The zero-knowledge proof $ZKP_i$ is a mathematical construct that proves the correctness of a certain statement without revealing anything else than this fact. That is, in particular neither the opening values for the commitment $C_i$ with i within F, nor the secret key of the verifier are leaked. At 708, the following group of variables may be sent from the user to the verifier: tok, $(a_i, C_i, o_i)_{i \in D}$, $(a_i, C_i, ZKP_i)_{i \in F}$.

The verifier may choose to send any ai, Ci, of to the auditor. However, the auditor may not be sure whether or not all attributes may be correct. The auditor simply may not be able to decide. The verifier may have manipulated things. However, for the group of variables (ai, Ci, oi)i∈E⊆D the auditor may be sure to have received trusted values of attributes for i∈E⊆D. This protocol ends at 710.

Figure 8:
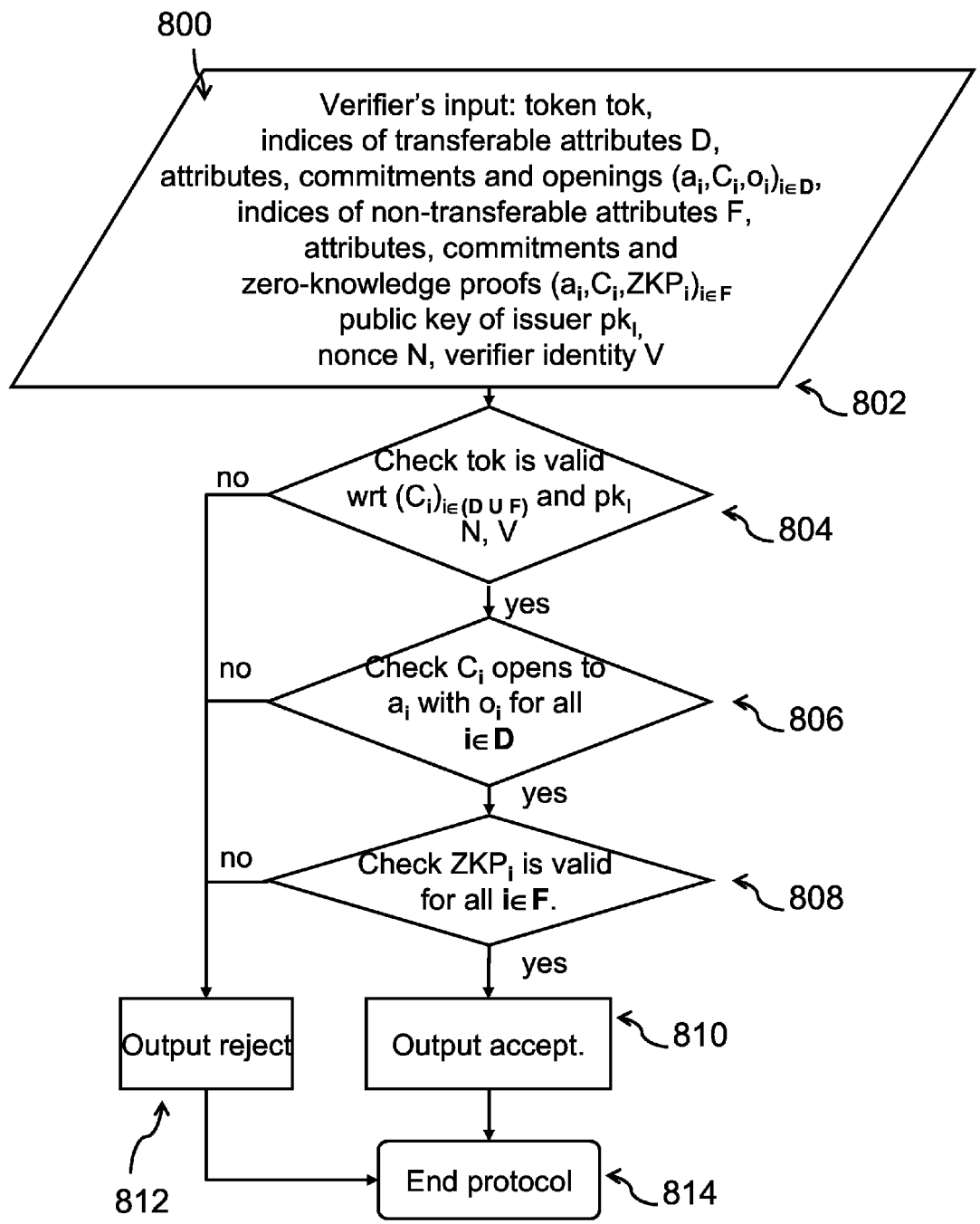
FIG. 8 shows a block diagram of a verification of received attributes by a verifier in the case of transferable and non-transferable attributes.

With reference to block diagram 800 of FIG. 8, for the case of partially non-transferable attributes from the verifier to an auditor, the verification process may be as follows: The verifier may use as input on his computer system, 802: verification token tok, indices of transferable attributes D, attributes, commitments and opening keys, hence, (ai,Ci,oi) i∈D. Further input values may be indices of non-transferable attributes F, the attributes, commitments and zero-knowledge proofs (ai, Ci, ZKPi)i∈F, as well as the public key of issuer pkI of the issuer and the secret key skV of the verifier.

In step 804, a check on the auditor's computer system is made whether tok is valid with respect to (Ci)i∈D∪F and pkI. For all steps, the verifier system needs also the public key pkV of the verifier as input. In case of "yes", at 806, the next check is made whether Ci opens to ai with of for all i∈E⊆D. In case of "yes", at 808, a further check is made whether ZKPi is valid for all i∈F. In case of a third "yes", the attributes are confirmed or accepted, 810, as valid in light of the original credential. In all other cases, 812, the attributes may be rejected, i.e., not be confirmed as trusted values in light of the original credential issued by the issuer for the user. This protocol may end at 814.

As a consequence, the user may have the advantage to control a trusted forward process from a verifier to an auditor. Only if the verifier limits the attribute forwarded to the auditor, to the ones allowed by the user, the auditor may get a save confirmation for the attributes forwarded by the verifier.

From a mathematical perspective, the processes from FIG. 7 and FIG. 8—in particular a construction with transferable and non-transferable attributes—may also be described in the following way:

Assume that the verifier has a public key pkV and corresponding secret key skV generated by an algorithm KeyGenV with an efficient zero-knowledge proof of knowledge of the secret key $PK\{(skV):(pkV, skV) \in KeyGenV\}$. As a remark: Such proof always exists using generic zero-knowledge techniques, but most practical public-key encryption and signature schemes may have much more efficient direct protocols.

As in the construction of mathematical background related to FIG. 3 and FIG. 4, let the issuer's public and secret key be those of a CL signature scheme, and let the user's credential on attribute values a0, . . . , aL be a CL signature (e, A, v) on (a0, . . . aL). When the user wants to create a verification token that discloses attributes ai for i∈D⊆ $\{0, \ldots, L\}$ in a transferable way to the verifier, and attributes ai for i∈F⊆ $\{0, \ldots, L\}$ in a non-transferable way, then the user may proceed as follows: For each disclosed attribute i∈D∪F he may create a commitment Ci=Com(ai,oi) for a random oi∈Zq. He then may re-randomize his credential (e, A, v) to (e, A', v') and creates a signature proof of knowledge, $\Sigma = SPK\{(i, v', a_0, \ldots a_L, (o_i)_{i \in D \cup F}:$ $Z = \pm R^{a_0}_0 \cdot \ldots \cdot R^{a_L}_L A'^e S'^{v'} \pmod{n} \land a_i \in \pm \{0, 1\}^{lm} \land 2^{le} > e > 2^{le-1} \land_{e \in D \cup F} C_i = g_0^{a_i} g_1^{o_i}\}((C_i)_{i \in D}, D, N, V)$.

For all non-transferable attributes i∈F, the user moreover may create a signature proof of knowledge showing that either Ci opens to ai—but without revealing the opening keys oi—or he knows the verifier's secret key skV:

$\Sigma_i = SPK\{(o_i, sk_V):$ $C_i/g_0^{a_i} = g_1^{o_i} \lor v(pk_V, sk_V) \in KeyGen_V\}$ It then sends the verification token tok=(A', v', Σ) together with (Ci)i∈D∪F, (ai, oi)i∈D and (ai, Σi)i∈F to the verifier. To verify the verification token, the verifier checks the signature proofs Σ and Σi for i∈F and checks that Ci=Com(ai, oi) for all i∈D.

The verification token derivation and the auditor's verification are similar to the construction related to FIGS. 3 and 4: the verifier sends tok=(A', v', Σ) together with D, (Ci)i∈D∪F, (ai, oi)i∈E, and F to the auditor, who checks Σ and checks that Ci=Com(ai, oi) for all i∈E.

Figure 9:
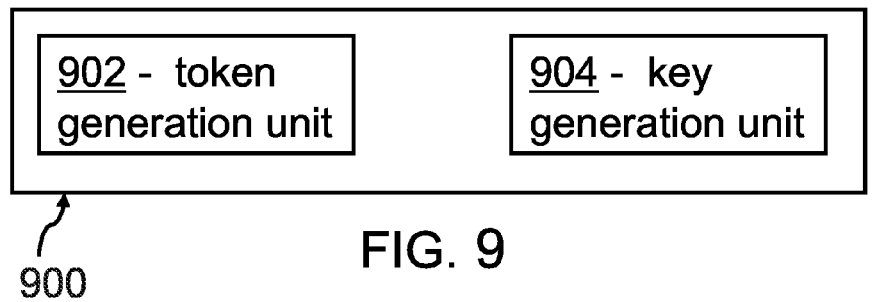
FIG. 9 shows an embodiment of the inventive system for deriving a verification token from a credential.

FIG. 9 shows a block diagram of an embodiment of a system 900 for deriving a verification token from a credential. The system 900 may comprise a verification token generation unit 902 adapted for generating the verification token out of the credential, wherein the verification token may comprise at least one commitment, wherein a commitment may be a blinded version of an attribute. The system 900 may further comprise a key generation unit 904 adapted for generating an opening key for the verification token enabling a generation of a confirmation for a validity of the attribute.

Figure 10:
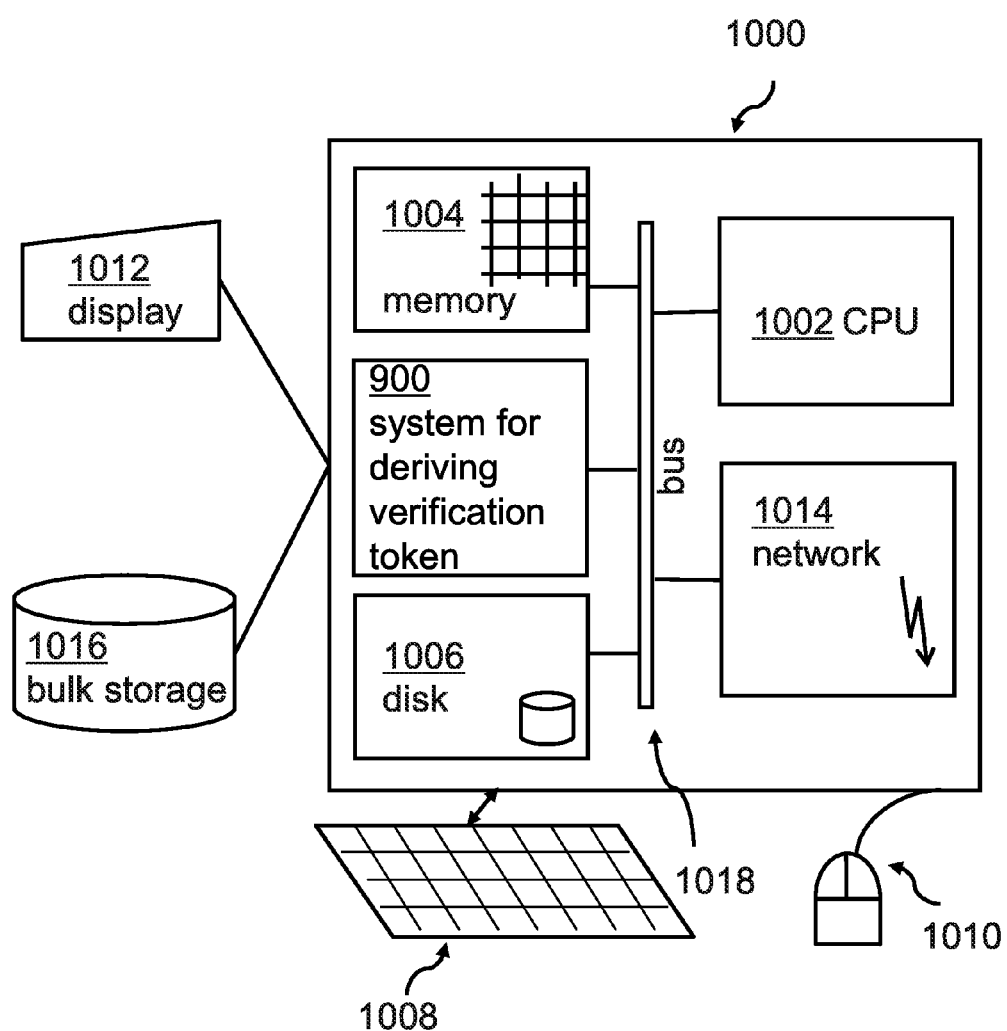
FIG. 10 shows an embodiment of a computer system comprising the system for deriving a verification token from a credential.

Embodiments of the invention may be implemented together with virtually any type of computer, regardless of the platform being suitable for storing and/or executing program code. For example, as shown in FIG. 10, a computing system 1000 may include one or more processor(s) 1002 with one or more core(s) per processor, associated memory elements 1004, an internal storage device 1006 (e.g., a hard disk, an optical drive such as a compact disk drive or digital video disk (DVD) drive, a flash memory stick, a solid-state disk, etc.), and numerous other elements and functionalities, typical of today's computers (not shown). The memory elements 1004 may include a main memory, e.g., a random access memory (RAM), employed during actual execution of the program code, and a cache memory, which may provide temporary storage of at least some program code and/or data in order to reduce the number of times, code and/or data that must be retrieved from a long-term storage medium or external bulk storage 1016 for an execution. Elements inside the computer 1000 may be linked together by means of a bus system 1018 with corresponding adapters. Any of the first system 206, second system 210 or third system 216 may be a computing system like the computing system 1000. Additionally, the system 900 for deriving a verification token from a credential may also be attached to the bus system 1018 by which the computing system 1000 may be modified and become a dedicated computing system for deriving a verification token from a credential.

The computing system 1000 may also include input means, such as a keyboard 1008, a pointing device such as a mouse 1010, or a microphone (not shown). Alternatively, the computing system may be equipped with a touch sensitive screen as main input device. Furthermore, the computer 1000, may include output means, such as a monitor or screen or display 1012 [e.g., a liquid crystal display (LCD), a plasma display, a light emitting diode display (LED), or cathode ray tube (CRT) monitor]. The computer system 1000 may be connected to a network (e.g., a local area network (LAN), a wide area network (WAN), such as the Internet or any other similar type of network, including wireless networks via a network interface connection 1014. This may allow a coupling to other computer systems or a storage network or a tape drive. Those, skilled in the art will appreciate that many different types of computer systems exist, and the aforementioned input and output means may take other forms. Generally speaking, the computer system 1000 may include at least the minimal processing, input and/or output means, necessary to practice embodiments of the invention.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

What is claimed is:

1. A method for deriving a verification token from a credential, the credential being a set of attributes certified by an issuer to a user using a public key of the issuer, the method comprising:
   generating the verification token out of the credential, wherein the verification token comprises at least one commitment, wherein a commitment is a blinded version of an attribute;
   generating an opening key for the verification token enabling a generation of a confirmation for a validity of the attribute,
   wherein the generating the verification token comprises binding of the verification token to a context string for preventing the verification token to be reusable together with a different context string;
   performing the generation of the verification token and the opening key in a first system;
   transferring a first tuple comprising an attribute, the verification token, and the opening key from the first system, the first tuple receivable by a second system, such that at the second system a confirmation about the validity of the attribute based on the first tuple and the public key of the issuer is obtainable;
   transferring from the first system a second tuple comprising a plurality of attributes together with a corresponding verification token comprising commitments for the plurality of attributes, and corresponding opening keys for each attribute and commitment combination, the second tuple being receivable by the second system;
   transferring from the second system to a third system, a subset of the plurality of attributes, the verification token, and a subset of opening keys related to the subset of the plurality of attributes; and
   obtaining at the third system a confirmation about the validity of the subset of the plurality of attributes based on the verification token, the subset of opening keys, and the public key of the issuer, wherein the obtaining of a confirmation at the third system is performed with a respective certified function from the issuer.

2. The method of claim 1, wherein the generation of the verification token is performed using a public key of the second system.

3. The method of claim 1, wherein the generating of the verification token is based on an anonymous credential scheme.

4. The method of claim 3, wherein the anonymous credential scheme is a Camenisch-Lysyanskaya Signature.

5. The method of claim 1, wherein an attribute is selected out of a group comprising first name, last name, address, age, customer number, credit line, account number, bank name, social security number, insurance number, and credit card number of the user.

6. The method of claim 1, wherein the generation of the verification token, the generation of the opening key, the obtaining of the confirmation at the second system and the obtaining of a confirmation at the third system is each performed with a respective certified function from the issuer.

7. The method of claim 1, wherein the generation of the verification token and corresponding opening key for commitments comprised in the verification token results in different verification tokens for identical credentials, each time the verification token is generated.

8. A system for deriving a verification token from a credential, the credential being a set of attributes certified by an issuer to a user using a public key of the issuer, the system comprising:
   a computer having a processor and a computer-readable storage device;
   a program embodied on the storage device for execution by the processor, the program having a plurality of program modules, the program modules including:
   a token generation module adapted for generating the verification token out of the credential, and for binding the verification token to a context string for preventing the verification token from being reusable together with a different context string, wherein the verification token comprises at least one commitment, and wherein a commitment is a blinded version of an attribute; wherein the generation of the verification token and the opening key in performed on a first system,
   wherein the program further comprises a first transferring module adapted to transfer a first tuple comprising an attribute, the verification token, and the opening key from the first system, the first tuple receivable by a second system, such that at the second system a confirmation about the validity of the attribute based on the first tuple and the public key of the issuer is obtainable;
   a key generation module adapted for generating an opening key for the verification token enabling a generation of a confirmation for a validity of the attribute;
   a second transferring module adapted to transfer from the first system a second tuple comprising a plurality of attributes together with a corresponding verification token comprising commitments for the plurality of attributes, and corresponding opening keys for each attribute and commitment combination, the second tuple being receivable by the second system;
   a third transferring module configured to transfer from the second system to a third system, a subset of the plurality of attributes, the verification token, and a subset of opening keys related to the subset of the plurality of attributes; and an obtaining module configured to obtain at the third system a confirmation about the validity of the subset of the plurality of attributes based on the verification token, the subset of opening keys, and the public key of the issuer.

9. The system of claim 8, wherein the generation of the verification token is performed using a public key of the second system.

10. The system of claim 8, wherein the generating of the verification token is based on an anonymous credential scheme.

11. The system of claim 10, wherein the anonymous credential scheme is a Camenisch-Lysyanskaya Signature.

12. A computer program product, comprising a non-transitory computer-readable storage medium having program code embodied therewith, the program code executable by a processor of a computer to perform a method comprising:

generating, by the processor, the verification token out of the credential, wherein the verification token comprises at least one commitment, wherein a commitment is a blinded version of an attribute;

generating, by the processor, an opening key for the verification token enabling a generation of a confirmation for a validity of the attribute, wherein the generating the verification token comprises binding, by the processor, the verification token to a context string for preventing the verification token to be reusable together with a different context string;

performing, by the processor, the generation of the verification token and the opening key in a first system; and transferring, by the processor, a first tuple comprising an attribute, the verification token, and the opening key from the first system, the first tuple receivable by a second system, such that at the second system a confirmation about the validity of the attribute based on the first tuple and the public key of the issuer is obtainable;

transferring, by the processor, from the first system a second tuple comprising a plurality of attributes together with a corresponding verification token comprising commitments for the plurality of attributes, and corresponding opening keys for each attribute and commitment combination, the second tuple being receivable by the second system;

transferring from the second system, by a processor of the second system, to a third system, a subset of the plurality of attributes, the verification token, and a subset of opening keys related to the subset of the plurality of attributes; and obtaining at the third system, by a processor of the third system, a confirmation about the validity of the subset of the plurality of attributes based on the verification token, the subset of opening keys, and the public key of the issuer.

13. The computer program product of claim 12, wherein the generation of the verification token is performed, by the processor, using a public key of the second system.

14. The computer program product of claim 12, wherein the generating of the verification token, by the processor, is based on an anonymous credential scheme.

* * * * *